Nov. 13, 1928.
W. E. NEWNAM
PIG STACKING MACHINE
Filed March 30, 1922
1,691,552
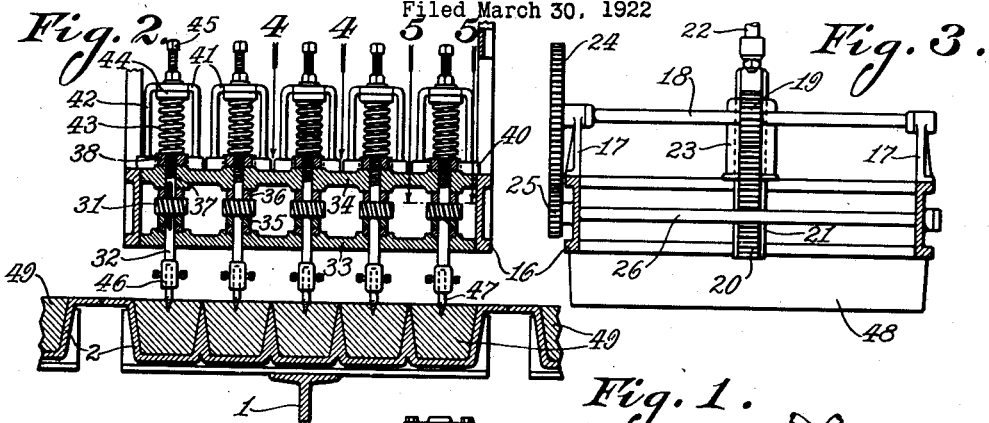
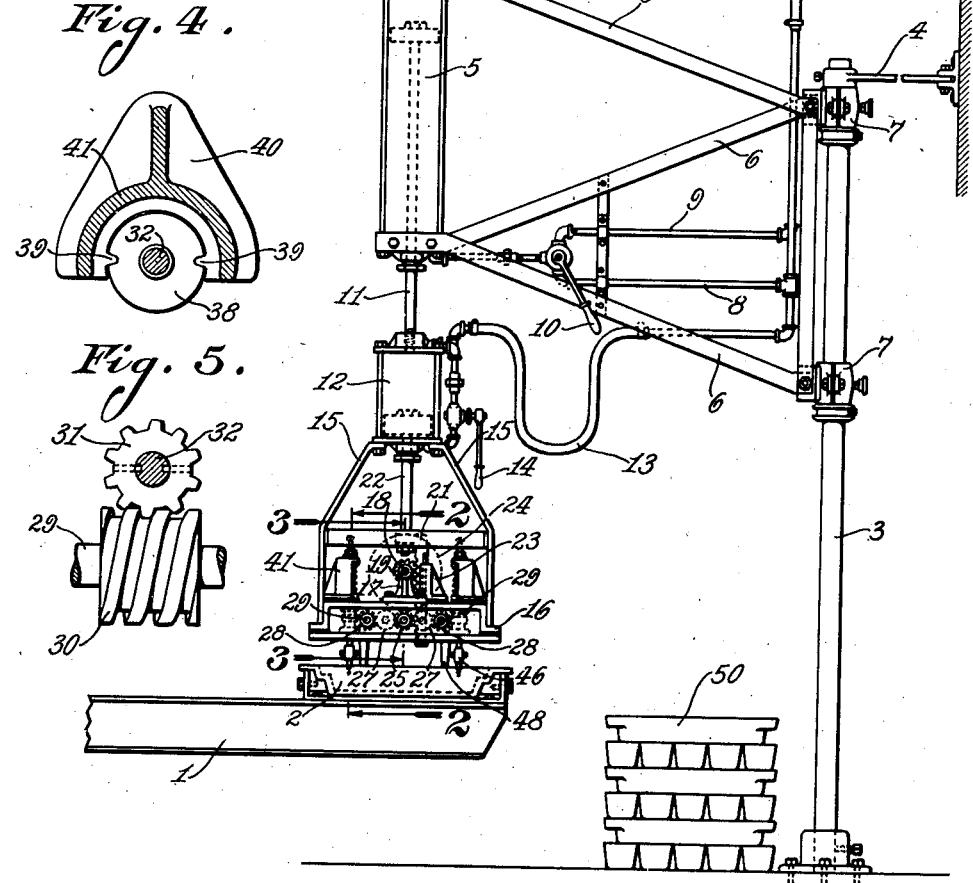
Inventor:
WILLIAM E. NEWNAM,
By John H. Bruninga,
His Attorney.

Patented Nov. 13, 1928.

1,691,552

UNITED STATES PATENT OFFICE.

WILLIAM E. NEWNAM, OF COLLINSVILLE, ILLINOIS, ASSIGNOR TO NATIONAL LEAD COMPANY, OF ST. LOUIS, MISSOURI, A CORPORATION OF NEW JERSEY.

PIG-STACKING MACHINE.

Application filed March 30, 1922. Serial No. 548,056.

This invention relates to stacking machines, and more particularly to machines for stacking pig lead and similar articles.

In the manufacture of pig lead, it is customary to run the molten lead into molds to form the same into so-called pigs. The molded pigs must thereafter be removed from the molds and deposited in some convenient place for storage. As the pigs are quite heavy, it is an expensive operation to remove them from the molds and stack them by hand. Furthermore, the pig molding is often done by machines in which the molds are arranged in gangs so that it is convenient to provide for handling the pigs in gangs by machines which will remove them from the molds and stack them for storage.

One of the objects of this invention, therefore, is to provide a machine for removing the pigs from the molds and depositing them in a suitable stack.

Another object of this invention is to provide means whereby a pig in the mold may be taken hold of and drawn from the mold by the machine. Another object of this invention is to provide convenient means for grasping a gang of pigs in a gang mold and removing the same from the mold, so as to deposit the lead in a suitable stack.

Another object of this invention is to provide novel means for engaging and holding a pig.

Further objects will appear from the detail description taken in connection with the accompanying drawing, in which:

Figure 1 represents a side view of a machine embodying this invention;

Figure 2 is an enlarged section on line 2—2, Figure 1;

Figure 3 is an enlarged section on line 3—3, Figure 1;

Figure 4 is an enlarged section on line 4—4, Figure 2; and

Figure 5 is an enlarged detail of the spiral gears for rotating the holding screws.

Referring to the accompanying drawing, 1 designates the wheel- or traveling-frame of a pig molding machine or other suitable means for supporting the pig mold 2. Mounted adjacent the pig mold support or machine on a suitable upright support 3, which may be fixed to the floor and suitably braced against the wall, as indicated in the brace 4, is a vertically arranged air cylinder 5. The cylinder 5 may be suitably supported upon a bracket 6 having a swivel connection 7 with the upright 3, so that said cylinder may be swung about the upright 3 as a pivot. Suitable air and exhaust connections 8 and 9 may be provided for the cylinder 5 controlled by a suitable control valve operated by a manipulative handle 10. This arrangement provides an air hoist upon which the pig holding and extracting mechanism is mounted.

Mounted upon and depending from the plunger rod 11 of the cylinder 5 is a second air cylinder 12. This cylinder has suitable air connections to both ends thereof supplied by an air hose 13 and controlled by a valve operated by a handle 14.

Suspended from the cylinder 12 by means of strap hangers 15 is a frame 16 which carries the pig holding devices.

Mounted on the frame 16 is a pair of brackets 17 adapted to provide bearings for a suitable shaft 18. This shaft carries at its middle portion a pinion 19 adapted to engage a rack 20 on an angular extension 21 mounted upon and depending from a plunger rod 22 of the air cylinder 12. This extension is provided with flanges adapted to slide in a T-groove in a vertical bracket 23 mounted on the frame 16. The bracket 23 provides a guide for the rack 20 in its up and down movement with the rod 22 so as to maintain said rack in proper engagement with the pinion 19.

The shaft 18 carries at its extremity a gear 24 meshing with a pinion 25 on the end of the shaft 26 having bearings in the frame 16. The pinion 25 also meshes with a pair of idler pinions 27 mounted on each side thereof on stub shafts mounted on the frame 16. The pinions 27 in turn each mesh with a pinion 28 mounted on shafts 29 extending transversely across the frame 16, and having bearings therein in a manner similar to that described for the shaft 26.

Mounted at intervals along each of the shafts 29 and fixed thereto are a series of spiral gears 30. These spiral gears 30 each mesh with a similar spiral gear 31 splined to a vertical spindle 32.

A plurality of these spindles 32 is provided. They are supported by and have bearings in a pair of plates 33 and 34 mounted upon and spanning the frame 16. The plates 33 and 34 are spaced from one another vertically and the gears 31 are mounted between them, each properly spaced by collars 35 and 36.

The spindles 32 are, therefore, arranged to be driven in rotation by the gears 31 but are also arranged to slide vertically in the plates 33 and 34 and then through the gears 31. Each spindle 32 is provided at its upper end with a threaded portion 37 adapted to engage a threaded collar 38 resting on the upper side of the plate 34 and being provided with notches adapted to engage a pair of lugs 39 extending inwardly from the base 40 of the bracket 41. There is a bracket 41 for each of the spindles 32. Each bracket is provided with an upright extension 42 adapted to provide a housing for a spring 43 engagi g an adjustable lug 44, mounted in the upper part of the bracket 41, and engaging also the collar 38.

The spring 43 is provided to exert a downward pressure on the spindle 32 for a purpose which will be hereinafter described. The lug 44 is arranged for adjustment in the bracket 41 by means of an adjusting screw 45 so that the spring pressure may be varied at will. The lower end of each spindle 32 is provided with a chuck 46 adapted to receive an anchor 47 in the form of a screw-point.

The spindles 32 are arranged in pairs across the frame 16. Each pair is arranged to engage one of the pigs in a line along the middle of the pig. The plate 33 is provided with ribs 48 arranged transversely of the frame 16 and adapted to provide feet for the entire mechanism to rest upon when lowered upon the pig molds.

The device operates as follows: The anchors 47 are normally held in retracted position by raising the piston in the cylinder 12 by admission of air to the lower portion thereof. This raises the plunger rod 22 and with it the rack 20, thereby rotating the pinion 19, the shaft 18, the gear 24 and through the train of gears 25, 27, 28, 30 and 31, rotates the spindles 32. Rotation of the spindles 32 in the collar 38 will cause said spindles to be raised or retracted by the action of the screw threads 37.

With the anchors in retracted position, as just described, the device is raised by means of the hoist 5 when it may be swung about the pivots 7 to a position over the pig molds. It is then lowered by exhausting the air from the cylinder 5 until the feet 48 rest upon the pig molds. The air is entirely exhausted from the cylinder 5 so that the whole weight of the apparatus will rest upon the feet 48.

Air is now admitted to the upper portion of the cylinder 12 by manipulation of the handle 14. The plunger 22 is thereby forced downwardly so as to rotate the pinion 19 in the opposite direction to that taken upon retraction of the anchors, as previously described. Upon such movement, the train of gearing 24, 25, 27, 28, 30 and 31 will be operated in the reverse direction to that previously described, whereupon the spindles 32 will not only be caused to rotate right handed, but by the action of the screw threads 37 in the nuts 38, the spindles will be moved downwardly. Upon such movement, the screw points 47 will be forced to penetrate the pigs 49 in the molds; for since the pitch of the threads 37 corresponds to the pitch of the screw points, these will be positively fed into the pigs. If, however, any one of the anchors should strike a high point on a pig, then the strong spring 43 will give to compensate for such high point. The anchors 47 thus working into the pigs, will hold them securely against the feet 48, each pig being supported at two spaced points Air is now admitted to the hoist 5 so as to raise the entire mechanism, whereupon the pigs 49 will be drawn from the molds 2. When the pigs are clear of the mold, the device may be swung about on the pivots 7 to a position where the retracted pigs may be lowered upon the stack 50 by means of the hoist 5. Upon depositing the pigs on the stack 50, the handle 14 may again be manipulated so as to admit air to the lower portion of the cylinder 12, whereupon the plunger 22 will be raised and the anchors retracted, as previously described, so as to release the pigs, leaving them upon the stack when the device is again lifted to be transferred to a new set of pig molds and the operation repeated. Since the cylinder 12 and the mechanism carried thereby can be turned with the rod 11 and its piston in the cylinder 5, and since the flexible hose 13 permits such movement, successive gangs of pigs may be stacked crosswise as shown in Figure 1.

As the frame 1 may be part of a molding machine by which a series of the above described gangs of pig molds may successively be brought to the delivery point, the above described machine is adapted to quickly and positively engage the pigs to take a secure hold thereon, and to positively draw the pigs from the molds and promptly deposit them upon the stack.

It is obvious that various changes may be made in details of construction without departing from the spirit of this invention; it is, therefore, to be understood that this invention is not to be limited to the specific details shown and described.

Having thus described the invention, what is claimed is:

1. A device for stacking pigs, comprising, a support, a carrier, a yielding screw on said carrier adapted to penetrate the pig, and means for mounting said carrier for manipulation on said support.

2. A device for stacking articles, comprising, holding means provided with a spring-controlled screw, means for operating said screw to penetrate the article to hold the same, and means for lifting the held article and placing the same in a stack.

3. A device for handling articles, comprising, a holder having a screw adapted to engage the article for holding the same, mechanism on said holder for rotating said screw, and a controller adapted upon manipulation to operate said mechanism to rotate said screw to engage the article, and upon further manipulation to operate said mechanism to release the article.

4. A device for handling articles, comprising, a holder having a spring-controlled screw adapted to engage the article for holding the same, mechanism on said holder for rotating said screw, and a controller adapted upon manipulation to operate said mechanism to rotate said screw to engage the article, and upon further manipulation to operate said mechanism to release the article.

5. A device for handling articles, comprising, a holder having a screw adapted to engage the article for holding the same, mechanism on said holder for rotating said screw, a controller adapted upon manipulation to operate said mechanism to rotate said screw to engage the article, and upon further manipulation to operate said mechanism to release the article, and a hoist adapted for lifting the held article to place the same in a stack.

6. In a machine of the character described having a pig mold, a carrier movable relatively thereto, an anchor on said carrier adapted to work into the pig, means for positioning said carrier in order to place said anchor over a pig in said mold, and means for operating said anchor to grip the pig.

7. In a machine of the character described having a pig mold, a support, a carrier movable relatively to said mold, a foot on said carrier adapted to engage the pig, an anchor on said carrier adapted to work into the pig in order to attach the same to the carrier, and means for operating said anchor.

8. In a machine of the character described having a pig mold, a support, a carrier movable relatively to said mold, a pair of anchors spaced along the pig and on said carrier dapted to work into the pig in order to attach the same to the carrier, and means for operating said anchors.

9. In a machine of the character described having a series of pig molds, a support, a carrier movable relatively to said molds, a series of anchor sets on said carrier, each set being arranged along a pig, and means for operating said anchors to work into the pigs in order to attach the same to the carrier.

10. In a machine of the character described having a pig mold, a carrier movable relatively thereto, an anchor on said carrier adapted to work into the pig in order to attach the same to said carrier, and means for moving said carrier adapted to draw the pig from the mold.

11. In a machine of the character described including molding mechanism and a series of adjacent pig molds, a support, a carrier movable relatively to said molds, a series of anchor sets on said carrier adapted to work into the pigs in order to attach the same to said carrier, and means for moving said carrier, constructed and arranged to draw the pigs from the molds.

12. In a machine of the character described including molding mechanism and a plurality of series of adjacent pig molds, a support, a carrier movable relatively to said molds, a series of anchor sets on said carrier adapted to work into the pigs in order to attach the same to said carrier, and means for moving said carrier, constructed and arranged to simultaneously draw the pigs of a series from the molds.

13. In a machine of the character described having a pig mold, a carrier, an anchor on said carrier and adapted to work into the top face of the pig while the carrier is sustained closely thereabove in order to attached the same thereto, and sustaining means for mounting said carrier for manipulation on said support.

14. In a machine of the character described having a pig mold, a carrier, an anchor on said carrier and adapted to work into the pig in the mold in order to attach the same to said carrier, and means for mounting said carrier for vertical and transverse movements on said support in order to draw the pig from the mold and place the same in a stack.

15. In a machine of the character described having a pig mold, a carrier, an anchor on said carrier and adapted to work into the pig in the mold in order to attach the same to said carrier, means for mounting said carrier for vertical and transverse movements on said support, and means for withdrawing said anchor.

16. In a machine of the character described having a pig mold, a carrier, an anchor on said carrier and adapted to work into the pig in the mold in order to attach the same to said carrier, means for mounting said carrier for vertical and transverse movements on said support in order to draw the pig from the mold and place the same in a stack, and means for withdrawing said anchor from the pig when the pig is stacked.

In testimony whereof I affix my signature this 14th day of March, 1922.

WILLIAM E. NEWNAM.